US012646486B2

(12) United States Patent
Choi et al.

(10) Patent No.: US 12,646,486 B2
(45) Date of Patent: Jun. 2, 2026

(54) DISPLAY APPARATUS FOR UPDATING INFORMATION OF DISPLAY BASED ON TYPE OF CABLE AND CONTROL METHOD THEREOF

(71) Applicant: SAMSUNG ELECTRONICS CO., LTD., Suwon-si (KR)

(72) Inventors: Yongsoo Choi, Suwon-si (KR); Jeonghyeon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/830,244

(22) Filed: Sep. 10, 2024

(65) Prior Publication Data

US 2025/0054462 A1 Feb. 13, 2025

Related U.S. Application Data

(63) Continuation of application No. PCT/KR2024/010285, filed on Jul. 17, 2024.

(30) Foreign Application Priority Data

Aug. 11, 2023 (KR) ........................ 10-2023-0105842
Oct. 16, 2023 (KR) ........................ 10-2023-0137745

(51) Int. Cl.
*G06F 3/038* (2013.01)
*G09G 5/00* (2006.01)

(52) U.S. Cl.
CPC ....... *G09G 5/006* (2013.01); *G09G 2370/042* (2013.01); *G09G 2370/14* (2013.01)

(58) Field of Classification Search
CPC ............. G09G 5/006; G09G 2370/042; G09G 2370/14
(Continued)

(56) References Cited

U.S. PATENT DOCUMENTS 8,200,855 B2 6/2012 Goodart et al.
8,862,791 B2 10/2014 Tao et al.
(Continued)

FOREIGN PATENT DOCUMENTS

CN 112073659 A 12/2020
JP 2009-111864 A 5/2009
(Continued)

OTHER PUBLICATIONS

Int. Search Report (PCT/ISA/210) dated Oct. 17, 2024 issued by the ISA in Int. App No. PCT/KR2024/010285.
(Continued)

*Primary Examiner* — Jonathan M Blancha
(74) *Attorney, Agent, or Firm* — Sughrue Mion, PLLC

(57) ABSTRACT

A display apparatus may include: a communication interface; a display; one or more processors connected with the communication interface and the display and configured to control the display apparatus; and a memory configured to store instructions which, when executed by the one or more processors, cause the display apparatus to: based on a cable being connected to the communication interface, identify a communication standard supported by the cable based on a voltage applied to a first pin in the communication interface; set identification information for the display based on the communication standard supported by the cable; and displaying an image on the display based on the identification information.

20 Claims, 8 Drawing Sheets

(58) Field of Classification Search
USPC .......................................................... 345/204
See application file for complete search history.

(56) References Cited

U.S. PATENT DOCUMENTS

| | | | | |
|---|---|---|---|---|
| 9,942,512 | B2 | 4/2018 | Kim et al. | |
| 11,158,284 | B2 | 10/2021 | Oh | |
| 11,200,833 | B2 | 12/2021 | Ishiwata | |
| 11,694,650 | B2 | 7/2023 | Oh | |
| 2004/0239676 | A1* | 12/2004 | Yoo | G09G 5/006 345/501 |
| 2007/0139551 | A1* | 6/2007 | Hwang | H04N 21/4122 348/554 |
| 2008/0104660 | A1 | 5/2008 | Oh | |
| 2010/0085482 | A1 | 4/2010 | Toba et al. | |
| 2010/0165197 | A1 | 7/2010 | Hattori | |
| 2011/0096822 | A1* | 4/2011 | Senoo | H04L 67/75 375/225 |
| 2012/0036284 | A1 | 2/2012 | Tao et al. | |
| 2014/0016684 | A1* | 1/2014 | Hong | G09G 5/006 375/232 |
| 2015/0222065 | A1 | 8/2015 | Toba | |
| 2016/0080721 | A1 | 3/2016 | Nakajima et al. | |
| 2017/0242804 | A1* | 8/2017 | Voor | G06F 3/023 |
| 2018/0139428 | A1 | 5/2018 | Komiyama | |
| 2018/0206277 | A1* | 7/2018 | Krenz | H04W 28/22 |
| 2019/0064899 | A1* | 2/2019 | Doi | G06F 1/266 |
| 2019/0116321 | A1* | 4/2019 | Grimm | H04N 21/41407 |
| 2020/0296449 | A1* | 9/2020 | Suzuki | H04N 21/43635 |
| 2020/0365112 | A1 | 11/2020 | Oh | |
| 2020/0372852 | A1 | 11/2020 | Ishiwata | |
| 2022/0036854 | A1 | 2/2022 | Oh | |

FOREIGN PATENT DOCUMENTS

| | | | |
|---|---|---|---|
| JP | 2018-077441 | A | 5/2018 |
| JP | 6907400 | B2 | 7/2021 |
| KR | 10-2012-0130121 | A | 11/2012 |
| KR | 10-2014-0005414 | A | 1/2014 |
| KR | 10-2016-0026075 | A | 3/2016 |
| KR | 10-2020-0132541 | A | 11/2020 |
| KR | 10-2021-0001867 | A | 1/2021 |
| KR | 10-2333724 | B1 | 12/2021 |
| WO | 2020/262990 | A1 | 12/2020 |

OTHER PUBLICATIONS

Written Opinion (PCT/ISA/237) dated Oct. 17, 2024 issued by the ISA in Int. App No. PCT/KR2024/010285.

Communication dated Mar. 2, 2026, issued by the European Patent Office By European Patent Application No. 24854321.7.

* cited by examiner

DISPLAY APPARATUS FOR UPDATING INFORMATION OF DISPLAY BASED ON TYPE OF CABLE AND CONTROL METHOD THEREOF

CROSS-REFERENCE TO RELATED APPLICATIONS

This application is a continuation of PCT/KR2024/010285, filed on Jul. 17, 2024, at the Korean Intellectual Property Receiving Office and claims priority under 35 U.S.C. § 119 to Korean Patent Application No. 10-2023-0105842, filed on Aug. 11, 2023, in the Korean Intellectual Property Office, and Korean Patent Application No. 10-2023-0137745, filed on Oct. 16, 2023, in the Korean Intellectual Property Office, the disclosure of which is incorporated by reference herein in its entirety.

BACKGROUND

1. Field

The disclosure relates to a display apparatus and a control method thereof. Specifically, the disclosure relates to a display apparatus that updates information of a display based on a type of cable and a control method thereof.

2. Description of Related Art

Extended display identification data (EDID) in a display apparatus and DisplayPort configuration data (DPCD) in a display apparatus that supports DisplayPort are design specifications which allow a source apparatus to identify an operation specification of a sink apparatus, and provide an image corresponding thereto. That is, the EDID and DPCD are essential elements of the display apparatus.

The sink apparatus may show whether special functions such as a variable refresh rate (VRR) is supported in addition to a resolution, a color depth, and a color space supported through the EDID. Accordingly, the EDID being changed may mean several characteristics of the sink apparatus mentioned above being changed. In addition, the DPCD may be a register showing the characteristics of the sink apparatus that support the DisplayPort, and determine a bit rate, a number of lanes of a DisplayPort Main Link which is to be formed through link training which is essentially carried out when joining the DisplayPort, and show whether a DisplayPort specialized function is supported. That is, the EDID and the DPCD may show the characteristics of the sink apparatus, and the EDID and the DPCD being changed may mean that a basic characteristic which can be supported by the sink apparatus being changed. Accordingly, the EDID and the DPCD should be changed according to a DisplayPort version.

In addition, the source apparatus may provide an image to the sink apparatus taking into consideration not only a capability of the sink apparatus, but also a capability of a cable. Because a maximum supported resolution varies according to a version of interface supported by the cable, a change in EDID and DPCD is necessary according to the capability of the cable.

In the related art, the EDID and the DPCD were changed by selecting the DisplayPort version (1.2/1.4) from an on screen display (OSD) menu. That is, rather than the EDID and the DPCD being set automatically according to the version of interface supported by the cable, there has been an inconvenience of a user having to grasp a DisplayPort version supported by a graphic card or a game console of the source apparatus and a DisplayPort version of the cable, and having to select a DisplayPort version of the OSD menu based therefrom.

In addition, if the user does not know the version of cable, or if the DisplayPort version on the OSD menu corresponding to the version of cable is not set, a screen may not be displayed. For example, if the DisplayPort version of the OSD menu is set to 1.4 while using a source apparatus that supports DisplayPort 1.2, a resolution that supports DisplayPort 1.4 but is not supported in DisplayPort 1.2 may not be output as the EDID and the DPCD of DisplayPort 1.4 are transferred. In addition, a screen may not be output at all due to a compatibility problem of not being able to process the EDID and the DPCD of DisplayPort 1.4 occurring.

Recently, with the introduction of DisplayPort 2.1, the user scenario has become more complicated. Currently, because most of the cables do not support DisplayPort 2.1, there is a high likelihood that a consumer may use a wrong cable when using a sink apparatus that supports DisplayPort 2.1.

In the related art, because the EDID and the DPCD of the sink apparatus are not automatically changed according to the cable, there is a high likelihood of a compatibility problem occurring if even one of the DisplayPort versions supported by the source apparatus, the sink apparatus, and the cable are not a match. For example, if a source apparatus of DisplayPort 2.1 and a sink apparatus of DisplayPort 2.1 are joined with a cable of DisplayPort 1.4, because the DisplayPort version of the OSD menu is not automatically changed from 2.1 to 1.4, an image with a resolution having a bandwidth of greater than or equal to UHBR-10 may not be transferred from the source apparatus to the sink apparatus. In addition, even if the DisplayPort versions of the source apparatus, the sink apparatus, and the cable are a match, if the DisplayPort version is maintained at 1.4 due to the DisplayPort version of the OSD menu not being changed, a problem of the consumer not being able to select the image with an outputtable resolution by using the bandwidth of greater than or equal to UHBR-10 may occur.

SUMMARY

According to one or more example embodiments, a display apparatus may include: a communication interface; a display; one or more processors connected with the communication interface and the display and configured to control the display apparatus; and a memory configured to store instructions which, when executed by the one or more processors, cause the display apparatus to: based on a cable being connected to the communication interface, identify a communication standard supported by the cable based on a voltage applied to a first pin in the communication interface; set identification information for the display based on the communication standard supported by the cable; and displaying an image on the display based on the identification information.

The identification information may include an extended display identification data (EDID) and a DisplayPort configuration data (DPCD) for the display.

The instructions, when executed by the one or more processors, may further cause the display apparatus to: identify the cable as being of a first communication standard based on the voltage being 0V; identify the cable as being of a second communication standard based on the voltage exceeding 0V and being within a first voltage range; and identify the cable as being of a third communication standard based on the voltage exceeding 0V, and being within a second voltage range which is higher or broader than the first voltage range.

The instructions, when executed by the one or more processors, may further cause the display apparatus to: based on a bit transfer rate of the communication standard supported by the cable being lower than a bit receive rate of the one or more processors, control the display to display a message that image playback is not possible through the cable.

The instructions, when executed by the one or more processors, may further cause the display apparatus to: set the EDID and the DPCD based on the communication standard supported by the cable and a specification of the display.

The instructions, when executed by the one or more processors, may further cause the display apparatus to: identify whether the cable is connected to the communication interface through a second pin in the communication interface; and identify the voltage applied to the first pin based on the cable being identified as connected to the communication interface.

The instructions, when executed by the one or more processors, may further cause the display apparatus to: respectively change an EDID and a DPCD stored in the memory to an EDID and a DPCD corresponding to the communication standard supported by the cable; and control the display to display a message guiding a change in the EDID and the DPCD.

The display apparatus further may include a user interface. The instructions, when executed by the one or more processors, may further cause the display apparatus to: based on an EDID and a DPCD corresponding to the communication standard supported by the cable respectively varying from an EDID and a DPCD stored in the memory, control the display to display a message guiding a change in the EDID and the DPCD; and respectively change the EDID and the DPCD stored in the memory to the EDID and the DPCD corresponding to the communication standard supported by the cable, based on a change command being received through the user interface.

The instructions, when executed by the one or more processors, may further cause the display apparatus to: based on an electronic apparatus being identified as connected through the cable after setting the EDID and the DPCD, control the communication interface to transmit a hot plug detect (HPD) signal to the electronic apparatus.

The instructions, when executed by the one or more processors, may further cause the display apparatus to: based on identifying that the cable is connected to the communication interface and that an electronic apparatus is connected through the cable, identify the voltage applied to the first pin; identify the communication standard supported by the cable based on the voltage; and after setting the EDID and the DPCD based on the communication standard supported by the cable, control the communication interface to transmit a HPD signal to the electronic apparatus.

The EDID and the DPCD may be provided to an electronic apparatus through the communication interface based on joining of the cable.

According to one or more example embodiments, a method of controlling a display apparatus, may include: based on a cable being connected to a communication interface of the display apparatus, identifying a communication standard supported by the cable based on a voltage applied to a first pin in the communication interface; setting identification information for a display of the display apparatus based on the communication standard supported by the cable; and displaying an image on the display based on the identification information.

The identification information may include an extended display identification data (EDID) and a DisplayPort configuration data (DPCD) for the display.

The identifying may include: identifying the cable as a cable of a first communication standard based on the voltage being 0V; identifying the cable as a cable of a second communication standard based on the voltage exceeding 0V and being within a first voltage range; and identifying the cable as a cable of a third communication standard based on the voltage exceeding 0V, and being within a second voltage range which is higher or broader than the first voltage range.

The method further may include: based on a bit transfer rate of the communication standard supported by the cable being lower than a bit receive rate of the display apparatus, displaying a message that image playback is not possible through the cable.

According to one or more example embodiments, a display apparatus may include: a communication interface; a display; one or more processors connected with the communication interface and the display and configured to control the display apparatus; and a memory configured to store instructions which, when executed by the one or more processors, cause the display apparatus to: based on a cable being connected to the communication interface, measure a voltage of a first pin in the communication interface; identify a communication standard supported by the cable based on the voltage applied of the first pin; and control the display to display an image based on a configuration corresponding to the communication standard supported by the cable.

The configuration may be DisplayPort configuration data (DPCD) for the display.

The instructions when executed by the one or more processors, may further cause the display apparatus to: identify the cable as supporting DisplayPort 1.4 based on the voltage being 0V; identify the cable as supporting DisplayPort 2.1 UHBR-10 based on the voltage being between 0.33V to 0.50V; and identify the cable as supporting DisplayPort 2.1 UHBR-20 based on the voltage being between 0.86V to 1.20V.

The instructions, when executed by the one or more processors, may further cause the display apparatus to: based on a bit transfer rate of the communication standard supported by the cable being lower than a bit receive rate of the one or more processors, control the display to display a message that image playback is not possible through the cable.

The instructions, when executed by the one or more processors, may further cause the display apparatus to: set the DPCD based on the communication standard supported by the cable and a specification of the display.

BRIEF DESCRIPTION OF THE DRAWINGS

Embodiments will be more clearly understood from the following detailed description taken in conjunction with the accompanying drawings in which.

DETAILED DESCRIPTION

Figure 1:
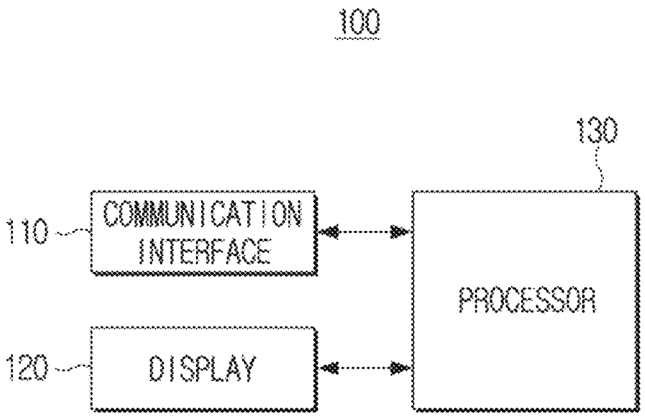
FIG. 1 is a block diagram illustrating a configuration of a display apparatus according to one or more embodiments of the disclosure.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

An object of the disclosure is in providing a display apparatus that automatically updates an EDID and a DPCD according to a DisplayPort version of a cable and a control method thereof.

The disclosure will be described in detail below with reference to the accompanying drawings.

Terms used in describing embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the relevant description. Accordingly, the terms used herein are not to be understood simply as its designation but based on the meaning of the term and the overall context of the disclosure.

In the disclosure, expressions such as “have”, “may have”, “include”, and “may include” are used to designate a presence of a corresponding characteristic (e.g., elements such as numerical value, function, operation, or component), and not to preclude a presence or a possibility of additional characteristics.

The expression at least one of A and/or B is to be understood as indicating any one of “A” or “B” or “A and B”.

Expressions such as “1st”, “2nd”, “first”, or “second” used in the disclosure may limit various elements regardless of order and/or importance, and may be used merely to distinguish one element from another element and not limit the relevant element.

A singular expression includes a plural expression, unless otherwise specified. It is to be understood that the terms such as “form” or “include” are used herein to designate a presence of a characteristic, number, step, operation, element, component, or a combination thereof, and not to preclude a presence or a possibility of adding one or more of other characteristics, numbers, steps, operations, elements, components or a combination thereof.

In the disclosure, the term “user” may refer to a person using a display apparatus or an apparatus (e.g., artificial intelligence electronic apparatus) using the electronic apparatus.

The disclosure will be described in greater detail below with reference to the accompanied drawings.

FIG. 1 is a block diagram illustrating a configuration of a display apparatus 100 according to one or more embodiments of the disclosure.

The display apparatus 100 may be an apparatus displaying an image, and an apparatus which includes a display such as, for example, and without limitation, a television (TV), a desktop personal computer (PC), a notebook, a smartphone, a tablet PC, and the like, and may be referred to as a sink apparatus. Here, the display apparatus 100 may be joined with an electronic apparatus referred to as a source apparatus via a cable, and may receive an image from the electronic apparatus. However, the above is not limited thereto, and the display apparatus 100 may be any apparatus so long as it is an apparatus capable of displaying an image.

As shown in FIG. 1, the display apparatus 100 may include a communication interface 110, a display 120, and a processor 130.

The communication interface 110 may be a configuration for performing communication with external apparatuses of various types according communication methods of various types. For example, the display apparatus 100 may perform communication with a server or an electronic apparatus through the communication interface 110.

The communication interface 110 may include a Wi-Fi module, a Bluetooth module, an infrared communication module, a wireless communication module, and the like. Here, each communication module may be implemented in at least one hardware chip form.

The Wi-Fi module and the Bluetooth module may perform communication in a Wi-Fi method and a Bluetooth method, respectively. When using the Wi-Fi module or the Bluetooth module, various connection information such as a service set identifier (SSID) and a session key may first be transmitted and received, and after communicatively joining using the same, various information may be transmitted and received. The infrared communication module may perform communication according to an infrared communication (Infrared Data Association (IrDA)) technology of transmitting data wirelessly in short range by using infrared rays present between visible rays and millimeter waves.

The wireless communication module may include at least one communication chip that performs communication according to various wireless communication protocols such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), and the like, in addition to the above-described communication methods.

Alternatively, the communication interface 110 may include a wired communication interface such as, for example, and without limitation, HDMI, DisplayPort, Thunderbolt, USB, RGB, D-SUB, DVI, and the like.

In addition thereto, the communication interface 110 may include at least one from among the wired communication modules that perform communication using a local area network (LAN) module, an Ethernet module, or a pair cable, a coaxial cable or an optical fiber cable, or the like.

The display 120 may be a configuration that displays an image, and implemented as a display of various forms such as a liquid crystal display (LCD), an organic light emitting diode (OLED) display, and a plasma display panel (PDP). In the display 120, a driving circuit, which may be implemented in a form of an a-si TFT, a low temperature poly silicon (LTPS) TFT, an organic TFT (OTFT), or the like, a backlight unit, and the like may be included. Meanwhile, the display 120 may be implemented as a touch screen coupled with a touch sensor, a flexible display, a three-dimensional display (3D display), or the like.

The processor 130 may control the display 120 to display an image.

The processor 130 may control an overall operation of the display apparatus 100. Specifically, the processor 130 may control the overall operation of the display apparatus 100 by being joined with each configuration of the display apparatus 100. For example, the processor 130 may control an operation of the display apparatus 100 by being joined with configurations such as the communication interface 110, the display 120, and a memory.

One or more processors may include one or more from among a central processing unit (CPU), a graphics processing unit (GPU), an accelerated processing unit (APU), a many integrated core (MIC), a neural processing unit (NPU), a hardware accelerator, or a machine learning accelerator. The one or more processors may control one or a random combination from among other elements of the display apparatus 100, and perform an operation associated with communication or data processing. The one or more processors may execute one or more programs or instructions stored in the memory. For example, the one or more processors may perform, by executing one or more instructions stored in the memory, a method according to one or more embodiments of the disclosure.

When a method according to one or more embodiments of the disclosure includes a plurality of operations, the plurality of operations may be performed by one processor, or performed by a plurality of processors. For example, when a first operation, a second operation, and a third operation are performed by a method according to one or more embodiments, the first operation, the second operation, and the third operation may all be performed by a first processor, or the first operation and the second operation may be performed by the first processor (e.g., a generic-purpose processor) and the third operation may be performed by a second processor (e.g., an artificial intelligence dedicated processor).

The one or more processor may be implemented as a single core processor that includes one core, or as one or more multicore processors that include a plurality of cores (e.g., a homogeneous multicore or a heterogeneous multicore). If the one or more processors are implemented as a multicore processor, each of the plurality of cores included in the multicore processor may include a memory inside the processor such as a cache memory and an on-chip memory, and a common cache shared by the plurality of cores may be included in the multicore processor. In addition, each of the plurality of cores (or a portion from among the plurality of cores) included in the multicore processor may independently read and perform a program command for implementing a method according to one or more embodiments of the disclosure, or read and perform a program command for implementing a method according to one or more embodiments of the disclosure due to a whole (or a portion) of the plurality of cores being interconnected.

When a method according to one or more embodiments of the disclosure includes a plurality of operations, the plurality of operations may be performed by one core from among the plurality of cores or performed by the plurality of cores included in the multicore processor. For example, when a first operation, a second operation, and a third operation are performed by a method according to one or more embodiments, the first operation, the second operation, and the third operation may all be performed by a first core included in the multicore processor, or the first operation and the second operation may be performed by the first core included in the multicore processor and the third operation may be performed by a second core included in the multicore processor.

In the embodiments of the disclosure, the one or more processors may refer to a system on chip (SoC), a single core processor, or a multicore processor in which at least one processor and other electronic components are integrated or a core included in the single core processor or the multicore processor, and the core herein may be implemented as the CPU, the GPU, the APU, the MIC, the NPU, the hardware accelerator, the machine learning accelerator, or the like, but the embodiments of the disclosure are not limited thereto. However, for convenience of description below, an operation of the display apparatus 100 will be described using the expression ‘processor 130.’

The processor 130 may identify, based on a cable being joined to the communication interface 110, a communication standard supported by the cable based on a voltage applied to a first pin included in the communication interface 110. Here, the communication standard may include a transfer protocol, a transfer standard, a transfer method, a transfer rate, a transfer type, and the like.

For example, the processor 130 may identify the cable as a cable of a first communication standard based on the identified voltage being 0V, identify the cable as a cable of a second communication standard based on the identified voltage exceeding 0V and the voltage being within a first voltage range, and identify the cable as a cable of a third communication standard based on the identified voltage exceeding 0V, and being a voltage within a second voltage range which is a greater range than the first voltage range. Here, the cable of the first communication standard may be a cable that supports DisplayPort 1.4 or a cable that supports a standard of less than or equal to that of, the cable of the second communication standard may be a cable that supports DisplayPort 2.1 UHBR-10, and the cable of the third communication standard may be a cable that supports DisplayPort 2.1 UHBR-20.

The cable that supports DisplayPort 1.4 or the cable that supports a standard of less than or equal to that thereof may not have resistance between a CONFIG1 pin and a CONFIG2 pin which correspond respectively to pins 13 and 14, and the cable that supports DisplayPort 2.1 UHBR-10 may be configured such that a resistance of 680 kohm is used between the CONFIG1 pin and the CONFIG2 pin, and the cable that supports DisplayPort 2.1 UHBR-20 may be configured such that a resistance of 220 kohm is used between the CONFIG1 pin and the CONFIG2 pin. According to one or more embodiments, the processor 130 may identify the voltage of the CONFIG2 pin, identify the cable as the cable that supports DisplayPort 1.4 or the cable that supports the standard of less than or equal to that of based on the identified voltage being 0V, identify the cable as the cable that supports DisplayPort 2.1 UHBR-10 based on the identified voltage being between 0.33V to 0.50V (first voltage range), and identify the cable as the cable that supports DisplayPort 2.1 UHBR-20 based on the identified voltage being between 0.86V to 1.20V (second voltage range). In other words, the second voltage range may be higher or broader than the first voltage range.

The processor 130 may set identification information for the display 120 based on the communication standard supported by the cable. Here, the identification information may include at least one from among an extended display identification data (EDID) or a DisplayPort configuration data (DPCD).

For example, the processor 130 may change, based on the cable being identified as the cable that supports DisplayPort 2.1 UHBR-20, the DisplayPort version of the OSD menu to 2.1, and set the EDID and the DPCD which correspond to DisplayPort 2.1. Here, the EDID and the DPCD may be provided to the electronic apparatus through the communication interface 110 based on the joining of the cable. The electronic apparatus may be an apparatus joined with the display apparatus 100 through the cable.

The display apparatus 100 may further include a memory, and the processor 130 may change the EDID and the DPCD stored in the memory to the EDID and the DPCD corresponding to the communication standard supported by the cable respectively, and control the display 120 to display a message guiding the change in the EDID and the DPCD. That is, the processor 130 may automatically change the EDID and the DPCD based on the communication standard supported by the cable, and provide a user with the message guiding of the change.

Alternatively, the display apparatus 100 may further include a memory and a user interface, and the processor 130 may control, based on the EDID and the DPCD corresponding to the communication standard supported by the cable varying from the EDID and the DPCD stored in the memory, respectively, the display 120 to display the message guiding of the change in the EDID and the DPCD, and change the EDID and the DPCD stored in the memory to the EDID and the DPCD corresponding to the communication standard supported by the cable respectively when a change command is received through the user interface. That is, the processor 130 may not automatically change the EDID and the DPCD based on the communication standard supported by the cable, and change the EDID and the DPCD after verification by the user.

The processor 130 may set the EDID and the DPCD based on the communication standard supported by the cable and a specification of the display 120. For example, the processor 130 may set, based on a resolution supported by the display 120 being lower than a resolution supported by a cable according to the communication standard supported by the cable, the EDID and the DPCD based on the specification of the display 120.

The processor 130 may control, based on a bit transfer rate according to the communication standard supported by the cable being lower than a bit receive rate of the processor 130, the display 120 to display a message that an image playback is not possible through the cable. For example, the processor 130 may set, based on the bit receive rate being 13.5, the EDID and the DPCD based on 13.5, and the electronic apparatus joined with the display apparatus 100 through the cable may provide an image at the bit transfer rate of 13.5 based on the received EDID and the DPCD. However, because the bit transfer rate of the cable is 10, the processor 130 may control the display 120 to display a message that an image playback is not possible through a current cable due to receiving of the image being delayed.

The processor 130 may identify whether the cable is joined to the communication interface 110 through a second pin included in the communication interface 110, and identify a voltage applied to the first pin based on the cable being identified as joined to the communication interface 110. That is, the processor 130 may first identify whether the cable is joined, and identify the voltage applied to the first pin to identify the communication standard supported by the cable based on the cable being identified as joined to the communication interface 110.

The processor 130 may control, based on an electronic apparatus being identified as joined through the cable after setting the EDID and the DPCD, the communication interface 110 to transmit a hot plug detect (HPD) signal to the electronic apparatus. That is, if an opposite side of the cable is joined to the electronic apparatus after one side of the cable is first joined to the display apparatus 100, the EDID and the DPCD may be in an already set state, and the HPD signal may be transmitted to the electronic apparatus without a separate additional operation.

Alternatively, the processor 130 may identify, based on identifying that the cable is joined to the communication interface and that an electronic apparatus is joined through the cable, a voltage applied to the first pin, identify the communication standard supported by the cable based on the identified voltage, and control, after setting the EDID and the DPCD based on the communication standard supported by the cable, the communication interface 110 to transmit the HPD signal to the electronic apparatus. That is, if the opposite side of the cable is joined to the display apparatus 100 after one side of the cable is first joined to the electronic apparatus, the HPD signal may be transmitted to the electronic apparatus prior to the EDID and the DPCD being set, but the processor 130 may delay a transmitting time-point of the HPD signal to after the EDID and the DPCD are set.

However, the above is not limited thereto, and the transmitting time-point of the HPD signal may be retransmitted without being delayed. For example, the processor 130 may control, based on identifying that the cable is joined to the communication interface 110 and that the electronic apparatus is joined through the cable, the communication interface 110 for the HPD signal to be transmitted to the electronic apparatus. Then, the processor 130 may identify the voltage applied to the first pin, identify the communication standard supported by the cable based on the identified voltage, and after setting the EDID and the DPCD based on the communication standard supported by the cable, control the communication interface 110 to retransmit the HPD signal to the electronic apparatus.

Figure 2:
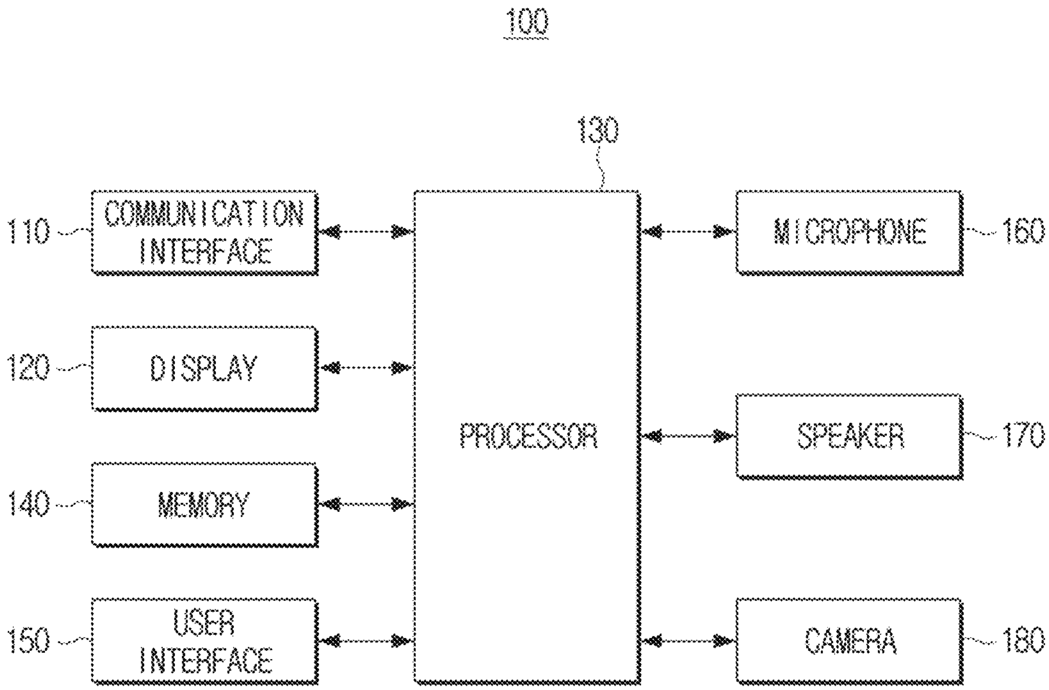
FIG. 2 is a block diagram illustrating a detailed configuration of a display apparatus according to one or more embodiments of the disclosure.

FIG. 2 is a block diagram illustrating a detailed configuration of the display apparatus 100 according to one or more embodiments of the disclosure. The display apparatus 100 may include the communication interface 110, the display 120, and the processor 130. In addition, according to FIG. 2, the display apparatus 100 may further include a memory 140, a user interface 150, a microphone 160, a speaker 170, and a camera 180. Detailed descriptions of parts overlapping with elements shown in FIG. 1 from among the elements shown in FIG. 2 will be omitted.

The memory 140 may refer to a hardware that stores information such as data in electric or magnetic form for the processor 130 and the like to access. To this end, the memory 140 may be implemented as at least one hardware from among a non-volatile memory, a volatile memory, a flash memory, a hard disk drive (HDD) or a solid state drive (SSD), a random access memory (RAM), a read only memory (ROM), and the like.

In the memory 140, at least one instruction necessary in an operation of the display apparatus 100 or the processor 130 may be stored. Here, the instruction may be a code unit that instructs an operation of the display apparatus 100 or the processor 130, and may be prepared in a machine language which is a language that can be understood by a computer. Alternatively, in the memory 140, the EDID and the DPCD for the display 120 may be stored.

The memory 140 may be stored with data which is information in a bit or byte unit that can represent a character, a number, an image, and the like. For example, the memory 140 may be stored with information on a use history of the display apparatus 100, information on a mode of the display apparatus 100, information on an operation method of the display apparatus 100, and the like.

The memory 140 may be accessed by the processor 130 and reading, writing, modifying, deleting, updating, and the like of the instruction, an instruction set, or data may be performed by the processor 130.

The user interface 150 may be implemented as a button, a touch pad, a mouse, a keyboard, and the like, or implemented also as a touch screen capable of performing a display function and an operation input function together therewith. Here, the button may be a button of various types such as a mechanical button, a touch pad, or a wheel which is formed at a random area at a front surface part or a side surface part, a rear surface part, or the like of an exterior of a main body of the display apparatus 100.

The microphone 160 may be a configuration for receiving input of a sound and converting to an audio signal. The microphone 160 may be electrically joined with the processor 130, and may receive sound by a control of the processor 130.

For example, the microphone 160 may be formed as an integrated-type integrated to an upper side or a front surface direction, a side surface direction or the like of the display apparatus 100. Alternatively, the microphone 160 may be provided in a remote controller, or the like separate from the display apparatus 100. In this case, the remote controller may receive sound through the microphone 160, and provide the received sound to the display apparatus 100.

The microphone 160 may include various configurations such as a microphone that collects sound in an analog form, an amplifier circuit that amplifies the collected sound, an A/D converter circuit that samples the amplified sound and converts to a digital signal, a filter circuit that removes noise components from the converted digital signal, and the like.

Meanwhile, the microphone 160 may be implemented in a form of a sound sensor, and may be any method so long as it is a configuration that can collect sound.

The processor 130 may receive a user command through the microphone 160.

The speaker 170 may be an element that outputs not only various audio data processed in the processor 130, but also various notification sounds, voice messages, or the like.

The processor 130 may provide various messages to the user through the speaker 170.

The camera 180 may include a lens, a shutter, an aperture, a solid-state imaging device, an Analog Front End (AFE), and a Timing Generator (TG). The shutter may be configured to adjust a time during which light reflected from a subject enters the camera 180, and the aperture may be configured to adjust an amount of light incident to the lens by mechanically increasing or decreasing a size of an opening part through which light enters. The solid-state imaging device may be configured to output, based on light reflected from the subject being accumulated as a photo charge, an image by the photo charge as an electric signal. The TG may be configured to output a timing signal for reading out pixel data of the solid-state imaging device, and the AFE may be configured to digitalize the electric signal output from the solid-state imaging device by sampling.

As described above, the inconvenience of the user having to manually change the EDID and the DPCD may be resolved due to the display apparatus 100 being able to identify the DisplayPort version of the cable, and automatically update the EDID and the DPCD based on the DisplayPort version.

An operation of the display apparatus 100 may be described in greater detail below through FIG. 3 to FIG. 7. In FIG. 3 to FIG. 7, individual embodiments will be described for convenience of description. However, the individual embodiments of FIG. 3 to FIG. 7 may be realized in any combined state.

Figure 3:
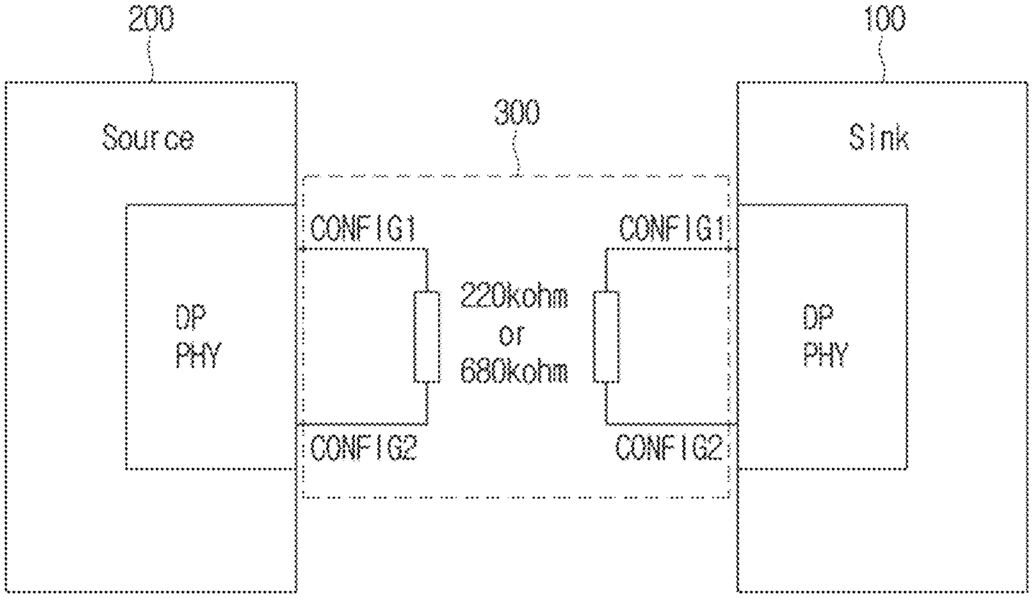
FIG. 3 is a diagram illustrating a structure of a cable according to one or more embodiments of the disclosure.

FIG. 3 is a diagram illustrating a structure of a cable according to one or more embodiments of the disclosure. In FIG. 3, for convenience of description, an electronic apparatus 200 that provides an image has been shown as the source apparatus, and the display apparatus 100 that receives the image has been shown as the sink apparatus.

The display apparatus 100 and the electronic apparatus 200 may be joined through a cable 300. The cable 300 may be a DisplayPort 2.1 standard, include a resistance of 680 kohm when a supported bit rate is UHBR-10, and include a resistance of 220 kohm when the supported bit rate is UHBR-20.

In FIG. 3, only an example of the cable 300 including resistance has been shown for convenience of description, but is not limited thereto. For example, if the cable 300 is DisplayPort 1.4 standard or a standard less than or equal to thereof, it may be in a short-circuited state without including resistance at a position corresponding to a resistance of 680 kohm or a resistance of 220 kohm in the DisplayPort 2.1 standard.

When the cable 300 is joined, the CONFIG1 pin may be joined to a DP_PWR pin which is the nineteenth pin of the cable 300 and voltage may be applied between the CONFIG1 pin and the CONFIG2 pin. The processor 130 may identify voltage of the CONFIG2 pin by using a general purpose input/output (GPIO) pin.

The processor 130 may identify the cable as a cable that supports DisplayPort 1.4 when the identified voltage is 0V, change the DisplayPort version of the OSD menu to 1.4, and set the EDID and the DPCD based on DisplayPort version 1.4.

Alternatively, the processor 130 may identify the cable as a cable that supports DisplayPort 2.1 when the identified voltage is 0.33V to 0.50V or 0.86V to 1.20V, change the DisplayPort version of the OSD menu to 2.1, and set the EDID and the DPCD based on DisplayPort version 2.1.

Figure 4:
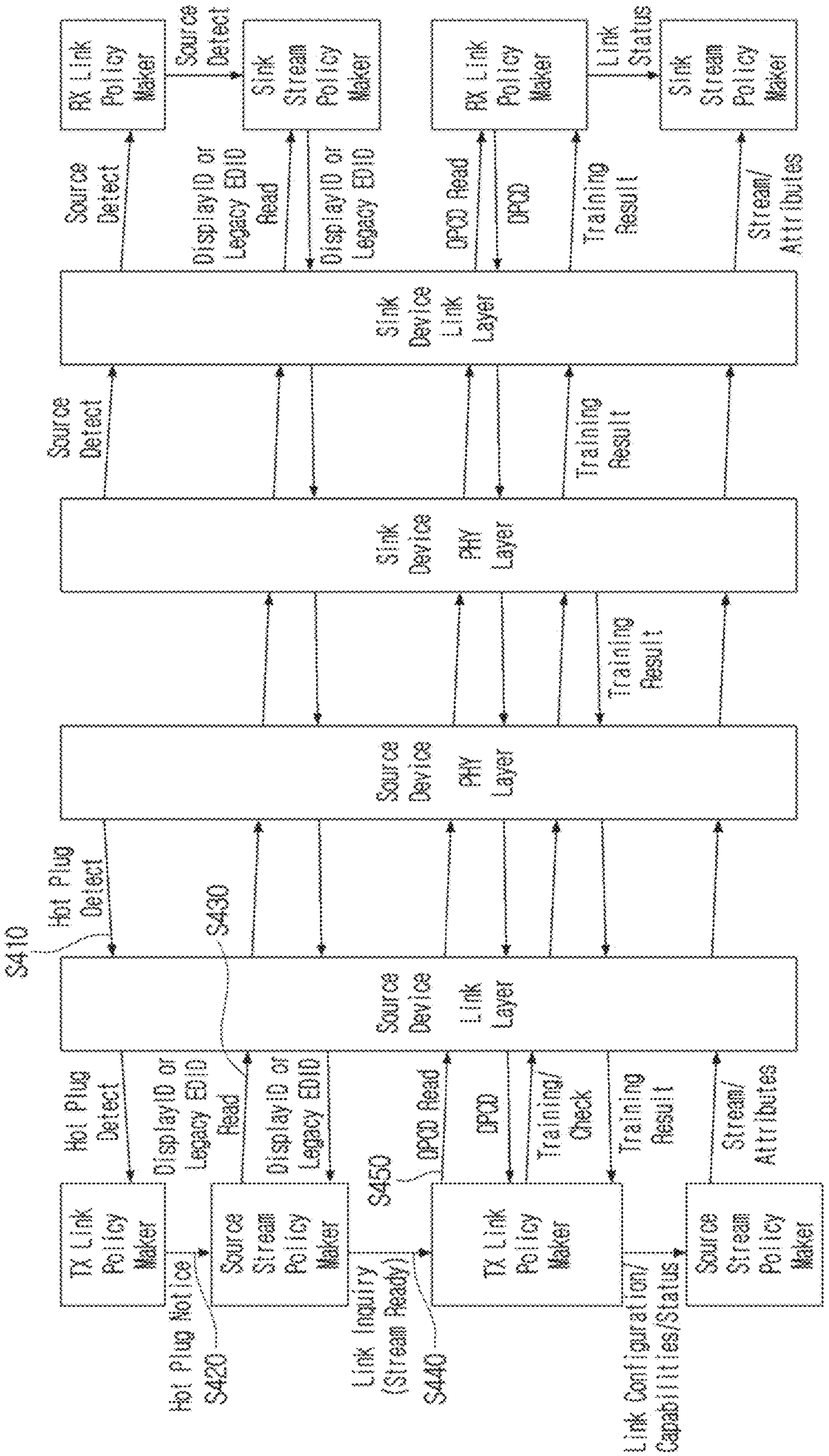
FIG. 4 is a diagram illustrating a transferring process of an EDID and a DPCD according to one or more embodiments of the disclosure.

FIG. 4 is a diagram illustrating a transferring process of the EDID and the DPCD according to one or more embodiments of the disclosure.

In FIG. 4, an interaction through a cable of the electronic apparatus which is the source apparatus and the display apparatus 100 which is the sink apparatus is shown in layers. A source apparatus link layer and a sink apparatus link layer may respectively be layers transmitting data between peripheral apparatus on a network using a physical layer that transfers a signal between apparatuses, and address allocation, error detection, and the like may be carried out. A source apparatus physical layer (PHY layer) and a sink apparatus PHY layer may respectively be layers that convert transmission data to a physical transmission signal and perform encoding or decoding. The EDID and the DPCD may be transmitted through each layer.

When the display apparatus 100 is joined to the cable, the HPD signal may be provided to a TX Link Policy Maker of the electronic apparatus (S410). The TX Link Policy Maker may provide a Hot Plug Notice to a Source Stream Policy Maker of the electronic apparatus (S420), and the Source Stream Policy Maker may provide a DisplayID or a Legacy EDID Read signal to a Sink Stream Policy Maker of the display apparatus 100 (S430), and receive the DisplayID or the Legacy EDID from the Sink Stream Policy Maker. Until the above-described process is carried out, the processor 130 of the display apparatus 100 may be in a state of having set the EDID and the DPCD based on the communication standard supported by the cable.

However, the embodiment is not limited thereto, and the processor 130 may provide the HPD signal to the electronic apparatus after having set the EDID and the DPCD based on the communication standard supported by the cable. Alternatively, the processor 130 may provide the HPD signal to the electronic apparatus, and after setting the EDID and the DPCD based on the communication standard supported by the cable, provide the HPD signal to the electronic apparatus again.

The Source Stream Policy Maker may provide a Link Inquiry (Stream Ready) to the TX Link Policy Maker (S440), and the TX Link Policy Maker may provide a DPCD Read signal to a RX Link Policy Maker of the display apparatus 100 (S450), and receive the DPCD from the RX Link Policy Maker.

Through the process as described above, the EDID and the DPCD of the display apparatus 100 may be provided to the electronic apparatus.

Figure 5:
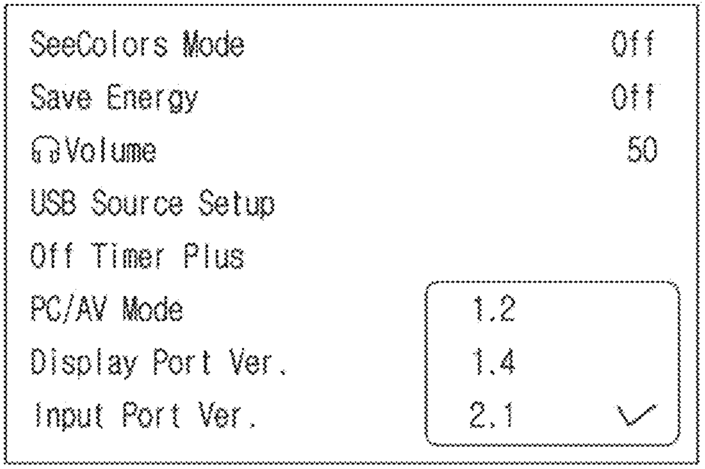
FIG. 5 is a diagram illustrating a DisplayPort version according to one or more embodiments of the disclosure.

FIG. 5 is a diagram illustrating a DisplayPort version according to one or more embodiments of the disclosure.

The processor 130 may identify (e.g. measure), based on the cable being joined to the communication interface 110, the voltage applied to the first pin included in the communication interface 110, identify the communication standard supported by the cable based on the identified voltage, set the EDID and the DPCD for the display 120 based on the communication standard supported by the cable, and control the display 120 to display a message guiding the change in the EDID and the DPCD (or display an image based on the set EDID and DPCD).

For example, the processor 130 may identify, based on the cable being joined to the communication interface 110, the voltage applied to the first pin included in the communication interface 110 as shown in FIG. 5, identify the communication standard supported by the cable based on the identified voltage as a standard of DisplayPort 2.1, set the EDID and the DPCD for the display 120 based on DisplayPort 2.1, and control the display 120 to display the message guiding the change in the EDID and the DPCD.

However, the embodiment is not limited thereto, and the processor 130 may provide an option of being able to manually change the DisplayPort version to the user by providing the OSD menu as in the screen shown in FIG. 5.

Figure 6:
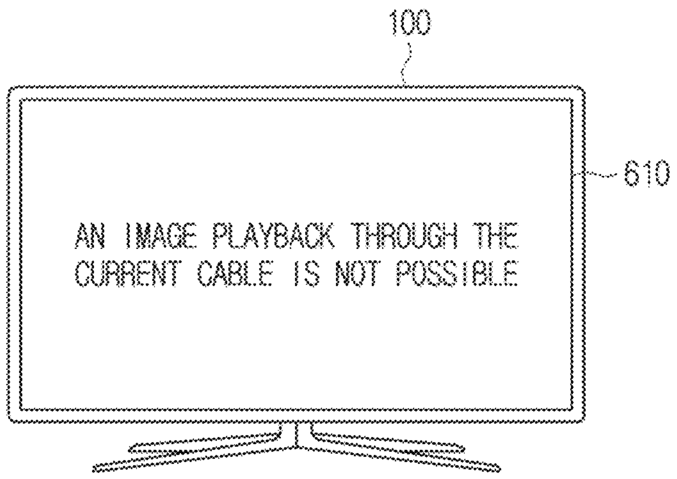
FIG. 6 is a diagram illustrating an example of a communication standard supported by a cable being low according to one or more embodiments of the disclosure.

FIG. 6 is a diagram illustrating an example of a communication standard supported by a cable being low according to one or more embodiments of the disclosure.

The processor 130 may control, based on the bit transfer rate according to the communication standard supported by the cable being lower than the bit receive rate of the processor 130, the display 120 to display the message that an image playback is not possible through the cable.

For example, the processor 130 may set, based on the communication standard supported by the cable being identified as a standard of DisplayPort 2.1, the EDID and the DPCD based on the standard of DisplayPort 2.1. Here, the bit transfer rate of the cable may not be included in the EDID and the DPCD, and the bit receive rate of 13.5 of the display apparatus 100 may be included. In this case, the electronic apparatus may provide an image to the display apparatus 100 based on the bit receive rate of the display apparatus 100. A problem may not occur if the cable supports DisplayPort 2.1 UHBR-20, but if the cable supports DisplayPort 2.1 UHBR-10, the image may not be properly transmitted because it is lower than 13.5.

The processor 130 may identify that the image transmission is delayed, and provide a message 610 such as "an image playback through the current cable is not possible" as shown in FIG. 6.

Figure 7:
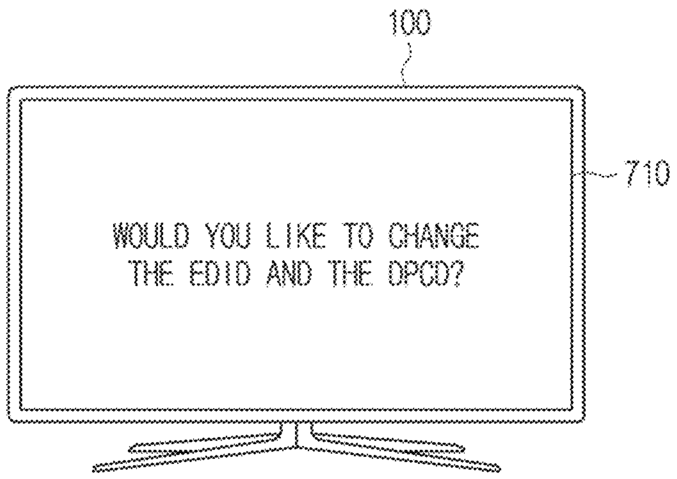
FIG. 7 is a diagram illustrating an example of a change in EDID and DPCD according to a communication standard supported by a cable being guided according to one or more embodiments of the disclosure.

FIG. 7 is a diagram illustrating an example of a change in EDID and DPCD according to a communication standard supported by a cable being guided according to one or more embodiments of the disclosure.

The processor 130 may control, based on the EDID and the DPCD corresponding to the communication standard supported by the cable varying from the EDID and the DPCD stored in the memory 140 respectively, the display 120 to display the message guiding the change in the EDID and the DPCD.

For example, the processor 130 may control, based on the EDID and the DPCD corresponding to the communication standard supported by the cable varying from the EDID and the DPCD stored in the memory 140 respectively as shown in FIG. 7, the display 120 to display a message 710 such as "would you like to change the EDID and the DPCD?".

The processor 130 may change the EDID and the DPCD stored in the memory 140 to the EDID and the DPCD corresponding to the communication standard supported by the cable respectively when the change command is received through the user interface 150.

That is, the processor 130 may set the EDID and the DPCD based on the communication standard supported by the cable, but may also inquire whether to change the EDID and the DPCD to the user.

The processor 130 may inquire, when a user is identified based on at least one from among a sound obtained through the microphone 160 or a captured image obtained through the camera 180, whether to change the EDID and the DPCD to the user. That is, the processor 130 may inquire whether to change the EDID and the DPCD to the user if a presence of the user is identified, and automatically change the EDID and the DPCD if the presence of the user is not identified.

Figure 8:
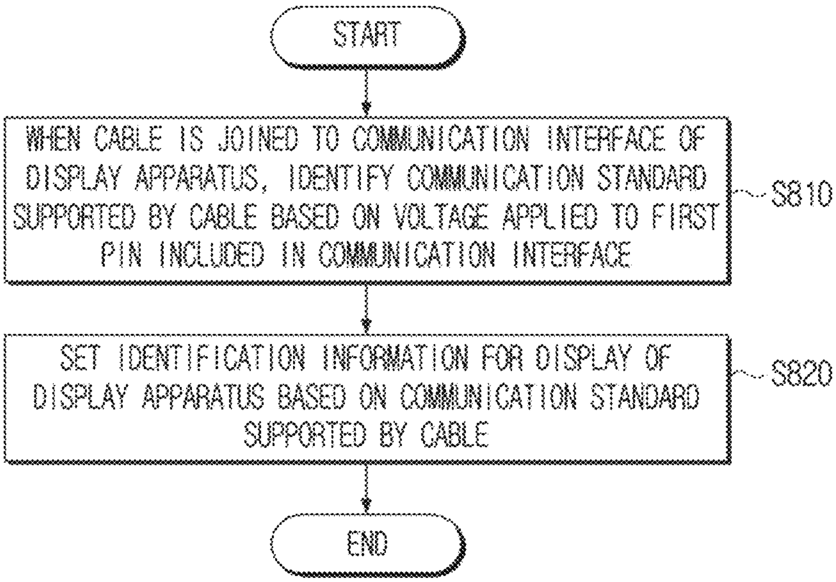
FIG. 8 is a flowchart illustrating a control method of a display apparatus according to one or more embodiments of the disclosure.

FIG. 8 is a flowchart illustrating a control method of a display apparatus according to one or more embodiments of the disclosure.

First, when the cable is joined to the communication interface of the display apparatus, the communication standard supported by the cable may be identified based on the voltage applied to the first pin included in the communication interface (S810). Then, the identification information for the display of the display apparatus may be set based on the communication standard supported by the cable (S820).

Further, the identification information may include the extended display identification data (EDID) and the DisplayPort configuration data (DPCD).

In addition, the identifying (S810) may include identifying the cable as the cable of the first communication standard based on the identified voltage being 0V, identifying the cable as the cable of the second communication standard based on the identified voltage exceeding 0V and being a voltage within the first voltage range, and identifying the cable as the cable of the third communication standard based on the identified voltage exceeding 0V, and being a voltage within the second voltage range which is a greater range than the first voltage range. In other words, the second voltage range may be higher or broader than the first voltage range.

Further, displaying, based on the bit transfer rate according to the communication standard supported by the cable being lower than the bit receive rate of the display apparatus, the message that an image playback is not possible through the cable may be further included.

In addition, the setting (S820) may include setting the EDID and the DPCD based on the communication standard supported by the cable and the specification of the display.

Further, identifying whether the cable is joined to the communication interface through the second pin included in the communication interface may be further included, and the identifying (S810) may include identifying the voltage applied to the first pin based on the cable being identified as joined to the communication interface.

In addition, the setting (S820) may include changing the EDID and the DPCD stored in the display apparatus to the EDID and the DPCD corresponding to the communication standard supported by the cable, respectively, and the control method may further include displaying the message guiding the change in the EDID and the DPCD.

Further, the setting (S820) may include displaying, based on the EDID and the DPCD corresponding to the communication standard supported by the cable varying from the EDID and the DPCD stored in the memory respectively, displaying the message guiding the change in the EDID and the DPCD, and changing the EDID and the DPCD stored in the display apparatus to the EDID and the DPCD corresponding to the communication standard supported by the cable respectively based on the change command being received.

In addition, transmitting, based on the electronic apparatus being identified as joined through the cable after setting the EDID and the DPCD, the hot plug detect (HPD) signal to the electronic apparatus may be further included.

Further, the identifying (S810) may include identifying, based on identifying that the cable is joined to the communication interface and that the electronic apparatus is joined through the cable, the voltage applied to the first pin, and the control method may further include transmitting, after setting the EDID and the DPCD based on the communication standard supported by the cable, the HPD signal to the electronic apparatus.

In addition, the EDID and the DPCD may be provided to the electronic apparatus through the communication interface based on joining of the cable.

According to the various embodiments of the disclosure as described above, the inconvenience of the user having to manually change the EDID and the DPCD may be resolved due to the display apparatus identifying the DisplayPort version of the cable, and automatically updating the EDID and the DPCD based on the DisplayPort version.

Meanwhile, according to one or more embodiments of the disclosure, the various embodiments described above may be implemented with software including instructions stored in a machine-readable storage media (e.g., computer). The machine may call an instruction stored in a storage medium, and as an apparatus operable according to the called instruction, may include an electronic apparatus (e.g., electronic apparatus (A)) according to the above-mentioned embodiments. Based on a command being executed by a processor, the processor may directly or using other elements under the control of the processor perform a function relevant to the command. The command may include a code generated by a compiler or executed by an interpreter. The machine-readable storage medium may be provided in a form of a non-transitory storage medium. Herein, 'non-transitory' merely means that the storage medium is tangible and does not include a signal, and the term does not differentiate data being semi-permanently stored or being temporarily stored in the storage medium.

In addition, according to one or more embodiments of the disclosure, a method according to the various embodiments described above may be provided included a computer program product. The computer program product may be exchanged between a seller and a purchaser as a commodity. The computer program product may be distributed in a form of the machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, according to one or more embodiments of the disclosure, the various embodiments described above may be implemented in a recordable medium which is readable by computer or an apparatus similar to computer using software, hardware, or a combination thereof. In some cases, the embodiments described herein may be implemented by the processor itself. According to a software implementation, embodiments such as procedures and functions described herein may be implemented with separate software modules. Each of the above-described software modules may perform one or more of the functions and operations described herein Meanwhile, computer instructions for performing processing operations of the machine according to the various embodiments described above may be stored in a non-transitory computer-readable medium. The computer instructions stored in this non-transitory computer-readable medium may cause a specific device to perform the processing operations in the machine according to the above-described various embodiments when executed by the processor of the specific device. The non-transitory computer-readable medium may refer to a medium that stores data semi-permanently rather than storing data for a very short time, such as a register, a cache, a memory, or the like, and is readable by the machine. Specific examples of the non-transitory computer-readable medium may include, for example, and without limitation, a compact disc (CD), a digital versatile disc (DVD), a hard disc, a Blu-ray disc, a USB, a memory card, a ROM, and the like.

In addition, respective elements (e.g., a module or a program) according to various embodiments described above may be formed of a single entity or a plurality of entities, and some sub-elements of the above-mentioned sub-elements may be omitted or other sub-elements may be further included in the various embodiments. Alternatively or additionally, some elements (e.g., modules or programs) may be integrated into one entity to perform the same or similar functions performed by the respective relevant elements prior to integration. Operations performed by a module, a program, or other element, in accordance with the various embodiments, may be executed sequentially, in parallel, repetitively, or in a heuristically manner, or at least some operations may be performed in a different order, omitted, or a different operation may be added.

While example embodiments of the disclosure have been illustrated and described above, it will be understood that the disclosure is intended to be illustrative, not limiting. It will be understood by those skilled in the art that various changes in form and details may be made therein without departing from the true spirit and full scope of the disclosure, including the appended claims and their equivalents.

What is claimed is:

1. A display apparatus, comprising:
a communication interface;
a display;
one or more processors connected with the communication interface and the display and configured to control the display apparatus; and a memory configured to store instructions which, when executed by the one or more processors, cause the display apparatus to:
based on a cable being connected to the communication interface, identify a communication standard supported by the cable based on a voltage applied to a first pin in the communication interface,
wherein the identifying of the communication standard supported by the cable includes identifying whether the cable is a cable of a first communication standard or a cable of a second communication standard;
set identification information for the display based on the communication standard supported by the cable; and
displaying an image on the display based on the identification information.

2. The display apparatus of claim 1, wherein the identification information comprises an extended display identification data (EDID) and a DisplayPort configuration data (DPCD) for the display.

3. The display apparatus of claim 2, wherein the instructions, when executed by the one or more processors, further cause the display apparatus to:
set the EDID and the DPCD based on the communication standard supported by the cable and a specification of the display.

4. The display apparatus of claim 2, wherein the instructions, when executed by the one or more processors, further cause the display apparatus to:
respectively change an EDID and a DPCD stored in the memory to an EDID and a DPCD corresponding to the communication standard supported by the cable; and
control the display to display a message guiding a change in the EDID and the DPCD.

5. The display apparatus of claim 2, further comprising:
a user interface,
wherein the instructions, when executed by the one or more processors, further cause the display apparatus to:
based on an EDID and a DPCD corresponding to the communication standard supported by the cable respectively varying from an EDID and a DPCD stored in the memory, control the display to display a message guiding a change in the EDID and the DPCD; and
respectively change the EDID and the DPCD stored in the memory to the EDID and the DPCD corresponding to the communication standard supported by the cable, based on a change command being received through the user interface.

6. The display apparatus of claim 2, wherein the instructions, when executed by the one or more processors, further cause the display apparatus to:
based on an electronic apparatus being identified as connected through the cable after setting the EDID and the DPCD, control the communication interface to transmit a hot plug detect (HPD) signal to the electronic apparatus.

7. The display apparatus of claim 2, wherein the instructions, when executed by the one or more processors, further cause the display apparatus to:
based on identifying that the cable is connected to the communication interface and that an electronic apparatus is connected through the cable, identify the voltage applied to the first pin;
identify the communication standard supported by the cable based on the voltage; and
after setting the EDID and the DPCD based on the communication standard supported by the cable, control the communication interface to transmit a HPD signal to the electronic apparatus.

8. The display apparatus of claim 1, wherein the instructions, when executed by the one or more processors, further cause the display apparatus to:
identify the cable as being the cable of the first communication standard based on the voltage being 0V;
identify the cable as being the cable of the second communication standard based on the voltage exceeding 0V and being within a first voltage range; and
identify the cable as a cable of a third communication standard based on the voltage exceeding 0V, and being within a second voltage range which is higher or broader than the first voltage range.

9. The display apparatus of claim 1, wherein the instructions, when executed by the one or more processors, further cause the display apparatus to:
based on a bit transfer rate of the communication standard supported by the cable being lower than a bit receive rate of the one or more processors, control the display to display a message that image playback is not possible through the cable.

10. The display apparatus of claim 1, wherein the instructions, when executed by the one or more processors, further cause the display apparatus to: identify whether the cable is connected to the communication interface through a second pin in the communication interface; and
identify the voltage applied to the first pin based on the cable being identified as connected to the communication interface.

11. The display apparatus of claim 1, wherein the EDID and the DPCD are provided to an electronic apparatus through the communication interface based on joining of the cable.

12. A method of controlling a display apparatus, the method comprising:
based on a cable being connected to a communication interface of the display apparatus, identifying a communication standard supported by the cable based on a voltage applied to a first pin in the communication interface,
wherein the identifying of the communication standard supported by the cable includes identifying whether the cable is a cable of a first communication standard or a cable of a second communication standard;
setting identification information for a display of the display apparatus based on the communication standard supported by the cable; and
displaying an image on the display based on the identification information.

13. The method of claim 12, wherein the identification information comprises an extended display identification data (EDID) and a DisplayPort configuration data (DPCD) for the display.

14. The method of claim 12, wherein the identifying comprises:

identifying the cable as the cable of the first communication standard based on the voltage being 0V;

identifying the cable as the cable of the second communication standard based on the voltage exceeding 0V and being within a first voltage range; and identifying the cable as a cable of a third communication standard based on the voltage exceeding 0V, and being within a second voltage range which is higher or broader than the first voltage range.

15. The method of claim 12, further comprising:

based on a bit transfer rate of the communication standard supported by the cable being lower than a bit receive rate of the display apparatus, displaying a message that image playback is not possible through the cable.

16. A display apparatus, comprising:

a communication interface;

a display;

one or more processors connected with the communication interface and the display and configured to control the display apparatus; and a memory configured to store instructions which, when executed by the one or more processors, cause the display apparatus to:

based on a cable being connected to the communication interface, measure a voltage of a first pin in the communication interface;

identify a communication standard supported by the cable based on the voltage applied of the first pin, wherein the identifying of the communication standard supported by the cable includes identifying whether the cable is a cable of a first communication standard or a cable of a second communication standard; and control the display to display an image based on a configuration corresponding to the communication standard supported by the cable.

17. The display apparatus of claim 16, wherein the configuration is DisplayPort configuration data (DPCD) for the display.

18. The display apparatus of claim 17, wherein the instructions, when executed by the one or more processors, further cause the display apparatus to:

set the DPCD based on the communication standard supported by the cable and a specification of the display.

19. The display apparatus of claim 16, wherein the instructions, when executed by the one or more processors, further cause the display apparatus to:

identify the cable as being the cable of the first communication standard based on the voltage being 0V, wherein the cable of the first communication standard supports DisplayPort 1.4;

identify the cable as being the cable of the second communication standard based on the voltage being between 0.33V to 0.50V, wherein the cable of the second communication standard supports DisplayPort 2.1 UHBR-10; and identify the cable as being a cable of a third communication standard based on the voltage being between 0.86V to 1.20V, wherein the cable of the third communication standard supports DisplayPort 2.1 UHBR-20.

20. The display apparatus of claim 16, wherein the instructions, when executed by the one or more processors, further cause the display apparatus to:

based on a bit transfer rate of the communication standard supported by the cable being lower than a bit receive rate of the one or more processors, control the display to display a message that image playback is not possible through the cable.

* * * * *